Patented Aug. 23, 1932

1,873,475

UNITED STATES PATENT OFFICE

ERNST POKORNY, OF LEIPZIG, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF PRODUCING CALCIUM MOLYBDATE

No Drawing. Application filed October 11, 1929, Serial No. 399,104, and in Germany December 8, 1928.

This invention relates to the production of molybdates of calcium.

In iron and steel industries calcium molybdate is at present being employed, to a continuously increasing extent, for producing ferromolybdenum and molybdenum steel. This calcium molybdate was hitherto usually made by starting from roasted molybdenite, preparing an alkali metal molybdate solution and precipitating therefrom calcium molybdate by adding milk of lime or a calcium salt under suitable conditions.

For simplifying this two-step process it has also been proposed, to boil raw molybdic acid with milk of lime and to evaporate the resulting product to dryness. From the fact that evaporation is expressly called for as an essential step of this process it appears that milk of lime was employed in excess this giving rise to the formation of soluble molybdates. As a rather considerable amount of liquid is needed for the reaction, this evaporation is a grave encumbrance on the process in question and would surely have been avoided had conditions been known for in any other way avoiding the losses caused by the formation of soluble molybdates. Consequently this process has commercially failed up to date, the possibility of carrying out the process in one operation being too heavily paid for by the necessity of evaporating the resulting product to dryness.

Now I have found that by maintaining certain conditions of working it is possible to avoid the formation of water-soluble calcium molybdate and therefore also the step of evaporation, thus rendering the one-step process commercially feasible. By treating the roasted molybdenite with milk of lime, preferably at boiling temperature, in such a manner as to avoid any excess of lime being present in the solution, the insoluble molybdate precipitates directly without any formation of soluble molybdates. This is obtained by carrying out the reaction in a solution in which the concentration of the calcium hydroxide is continuously kept at a level which is represented by a just merely testable alkaline reaction.

It is well known that molybdic acid is soluble in water, though only to a slight, but perceptible extent. According to my invention the reaction with the gradually added milk of lime takes place in such a way that the dissolved molybdic acid enters at once into reaction with the milk of lime so as to form insoluble calcium molybdate, whereby the small amounts of molybdic acid thus withdrawn, are immediately replaced by further quantities entering into the solution which, in their turn, are reacted upon by the milk of lime added in the meantime, etc. As already mentioned above, an excess of lime should be carefully avoided to prevent the formation of soluble molybdates. This is preferably attained by continuously testing the basicity of the solution by means of litmus paper, care being taken that the basicity never exceeds the amount required for just slightly blueing red litmus paper.

Of course, when following my new method, the contaminations or accompanying constituents contained in the roasted material, above all the gangue of the ore, remain in the product. However, as far as ores of commercial purity are concerned, this is of no consequence regarding the purposes in question. The acid gangue moreover renders the addition of sand superfluous which otherwise is required for the smelting processs. The greater part of the arsenic contents is already eliminated by the roasting operation if the latter be suitably conducted. Any considerable contents of copper or bismuth may be removed, before roasting, according to any of the well known methods.

The following example is adapted to illustrate my invention, but it is not intended to limit it thereto.

The product obtained by a thorough roasting of molybdenite in the concentrated form in which it is usually marketed (containing about 50% of molybdenum), is levigated in three to six times the quantity of water. While continuously stirring, milk of lime containing about 20–25% of calcium oxide is added to the boiling molybdenite suspension, care being taken, that the milk of lime is added only in such small quantities that a weakly alkaline reaction of the solution is attained. The reaction is tested by means of litmus paper. If the alkaline reaction of the solution, even after three minutes of uninterrupted boiling and stirring is still maintained, formation of the calcium molybdate is completed. Any excess of milk of lime should be avoided in order to prevent parts of the calcium molybdate from redissolving. However, if the alkaline reaction of the solution is not permanent, the formation of the calcium molybdate is still unaccomplished.

Upon completion of the conversion, the reaction product is washed by decanting and subsequently filtered and dried. The product thus obtained from molybdenite in the concentrated form contains approximately 40% molybdenum, and may be introduced into the steel bath in either a loose state or in the form of briquettes produced therefrom. In view of the gangue still present in the final product according to the above described process, the briquettes formed therefrom are more solid than those made from pure calcium molybdate.

The production of calcium molybdate according to the present invention requires so few technical appliances that the conversion may be effected at the site of production of the ores thereby obtaining a product of increased value with little additional expense.

I claim:

1. The process which comprises gradually adding calcium hydroxide to a substance containing molybdenum oxide in the presence of water at such a rate as to maintain, in the solution, a basicity just sufficient to blue litmus paper, and removing the precipitate.

2. The process which comprises gradually adding milk of lime to a substance containing molybdenum oxide in the presence of water at such a rate as to maintain, in the solution, a basicity just sufficient to blue litmus paper, and removing the precipitate.

3. The process which comprises gradually adding milk of lime to roasted molybdenite in the presence of water at such a rate as to maintain, in the solution, a basicity just sufficient to blue litmus paper, and removing the precipitate.

4. The process which comprises gradually adding milk of lime to a suspension of finely divided roasted molybdenite in water at such a rate as to maintain, in the solution a basicity just sufficient to blue litmus paper, and removing the precipitate.

5. The process which comprises gradually adding milk of lime to a suspension of finely divided roasted molybdenite in boiling water at such a rate as to maintain, in the solution, a basicity just sufficient to blue litmus paper, and removing the precipitate.

In testimony whereof, I affix my signature.

ERNST POKORNY.